United States Patent
Wakabayashi

[11] Patent Number: 6,115,459
[45] Date of Patent: Sep. 5, 2000

[54] TELEPHONE SWITCHING SYSTEM FOR EASILY IMPLEMENTING MODIFICATION OF CONNECTION INFORMATION AND MEDIUM STORING TELEPHONE SYSTEM CONTROL PROGRAM

[75] Inventor: Kunihiko Wakabayashi, Tokyo, Japan

[73] Assignee: NEC Corporation, Tokyo, Japan

[21] Appl. No.: 09/020,293

[22] Filed: Feb. 6, 1998

[30] Foreign Application Priority Data

Feb. 7, 1997 [JP] Japan .................................. 9-025431

[51] Int. Cl.[7] .................................................. H04M 1/00
[52] U.S. Cl. .......................... 379/156; 379/165; 379/166; 379/245; 379/377; 379/383
[58] Field of Search .............. 379/93.02, 93.03, 379/156, 196, 197, 198, 242, 245, 265, 165, 166, 377, 378, 383

[56] References Cited

U.S. PATENT DOCUMENTS

| | | | |
|---|---|---|---|
| 4,088,844 | 5/1978 | Kinnaird, Jr. .......................... | 379/162 |
| 4,327,256 | 4/1982 | Crooks et al. .......................... | 379/156 |
| 4,928,306 | 5/1990 | Biswas et al. .......................... | 379/201 |
| 4,953,200 | 8/1990 | Yamasaki ................................ | 379/156 |
| 5,151,934 | 9/1992 | Hayashi .................................. | 379/159 |
| 5,365,581 | 11/1994 | Baker et al. ........................... | 379/196 |
| 5,400,397 | 3/1995 | Ryu ........................................ | 379/201 |

FOREIGN PATENT DOCUMENTS

| | | |
|---|---|---|
| 61-201551 | 9/1986 | Japan . |
| 1-233947 | 9/1989 | Japan . |
| 3-053796 | 3/1991 | Japan . |
| 6-098363 | 4/1994 | Japan . |

*Primary Examiner*—Krista Zele
*Assistant Examiner*—Bing Bui
*Attorney, Agent, or Firm*—Foley & Lardner

[57] ABSTRACT

A telephone switching system 10 comprises a plurality of physical ports 20, and switches removable terminals based on predetermined connection information, wherein such connection information is arranged to be capable of being stored and rewritten in a RAM 60 by inputting from the terminal. When a physical port connecting to a terminal interface 30 is reconnected from a first terminal to a second terminal, a CPU 40 rewrites the connection information stored in the RAM 60 so that an extension number the user desires is stored for the physical port reconnected with the terminal.

8 Claims, 5 Drawing Sheets

| PHYSICAL PORT NUMBER | EXTENSION NUMBER | TERMINAL TYPE | PASSWORD |
|---|---|---|---|
| A1 | B1 | C1 | D1 |
| A2 | B2 | C2 | D2 |
| A3 | B3 | C3 | D3 |
| --------- | --------- | --------- | --------- |
| Am | Bm | Cm | Dm |

TELEPHONE SWITCHING SYSTEM FOR EASILY IMPLEMENTING MODIFICATION OF CONNECTION INFORMATION AND MEDIUM STORING TELEPHONE SYSTEM CONTROL PROGRAM

BACKGROUND OF THE INVENTION

1. Field of the Invention

The present invention relates to a telephone switching system for connecting a plurality of outer lines including Private branch exchange (PBX) lines or public telephone lines and a plurality of telephone terminals (hereinafter called the "terminal), and performing extension connection between the terminals, and, more particularly, to a telephone switching system for easily implementing modification of connection information when a terminal is moved, and a medium storing a telephone system control program.

2. Description of the Prior Art

Conventionally, such telephone switching system separately stores connection information such as an extension number of each terminal and abbreviated dialing number. When the terminal is moved due to rearrangement of an office, a service engineer or operator has to modify the setting of such connection information for the telephone switching system.

To simplify such modification of the setting, information a telephone switching system disclosed in Japanese Patent Application Laid-Open No. 61-201551 is connected with a terminal which fixedly stores a uniquely identifier called a terminal identification number. When a terminal is newly connected, the telephone switching system acquires the number of the physical port to which the terminal is connected (physical port number) and the terminal identification number notified from the terminal, and stores them as connection information.

Subsequently, when the terminal is changed or moved and connected to another physical port, the telephone swithcing system similarly acquires the physical port number and the terminal identification number from the terminal which is connected after movement, and determines from where to where the terminal moves based on such connection information and the one previously stored.

Thereafter, the previously registered information on the extension number or the like is made valid by rewriting the previously stored connection information of the terminal so that it matches the current connection state.

However, when a connection of a physical port is changed by moving a terminal in the conventional telephone switching system, the previously registered information such as on the extension number is valid only when the terminal user does not change the terminal he/she uses, but only modifies the connection to the physical port. That is, the terminal user must use the same terminal before and after the terminal is moved. If the user uses different terminals before and after movement, there arises a problem that the physical port after the movement is associated with connection information for a different terminal (for example, the extension number becomes one for the different terminal), and the terminal has an extension number which the terminal user does not intend.

Further, when the terminal is changed to another terminal due to trouble or a breakdown, the changed terminal cannot be activated because the connection information is different from the previously connected terminal.

SUMMARY OF THE INVENTION

The present invention is made in view of the above problem, and intended to provide a telephone switching system which prevents connection information of a different terminal from being reflected and enables it not to cause mismatch of connection information such as an extension number or the like, while the user does not need to be aware of his/her terminal when moving or changing terminals, and to provide a medium storing a telephone system control program.

In the telephone switching system of the present invention, physical ports are individually connecting to a plurality of terminals, and an exchange circuit performs the switching between the terminals and an outer line through the physical ports and between the terminals through the physical ports based on predetermined connection information. A connection information storing circuit stores individual connection information representing a connecting relation between each of the terminals and the physical port. A detecting circuit detects whether a first terminal among the terminals is disconnected from a first physical port among the physical ports, and then a second terminal is connected to the first physical port. A connection information modifying circuit modifies the connection information stored in the connection information storing circuit so that desired connection information representing a connecting relation between the first physical port and the second terminal is stored for the first physical port to which the second terminal is connected.

In the telephone switching system, the connection information modifying circuit is convenient to receive the desired connection information from the terminal through the physical port. In this case, the desired connection information contains an extension number of a terminal to be connected to the physical port.

Alternatively, the desired connection information includes an extension number of a terminal to be connected to the physical port, information by the type of terminal, and a password.

More specifically, the connection information modifying circuit receives the extension number from the terminal through the physical port, determines whether the received extension number is stored in the connection information storing circuit, and, if so, modifies the previously stored connection information to the desired connection information.

Alternatively, the connection information modifying circuit receives the extension number and the password from the terminal through the physical port, determines whether the received extension number is stored in the connection information storing circuit, if so, determines whether the password and the terminal type information are stored in the connection information storing circuit, and, if so, modifies previously stored connection information to the desired connection information.

The connection information modifying circuit may has a timer performing clocking for a predetermined period of time. When the detecting circuit detects disconnection of the first terminal, the timer is caused to start clocking for the predetermined period of time, and when connection of the second terminal is detected after completion of the clocking, connection information stored in the connection information storing circuit is modified so that desired connection information is stored for a physical port to which the second terminal is connected.

When the timer is caused to start clocking, and the second terminal is connected before completion of the clocking, the connection information modifying circuit receives the terminal type from the second terminal through a physical port to which the second terminal is connected, and inhibits communication with the second terminal when the terminal type for the physical port is not stored in the connection information storing circuit.

Now, the exchange circuit is described with a more specific example. When a terminal calls another terminal through an extension, the connection information storing means is searched by using an extension number input from the calling terminal through a key operation, and a call is performed on the basis of a physical port number to which an applicable terminal is connected. Of course, the connection information is not limited to a physical port number or an extension number, but may include an abbreviated dialing number, or an identifier for identifying a terminal user. It may not be limited to a specific one.

It is a matter of course that the control flow described above may be implemented by using a computer program. In this case, a medium storing a telephone system control program for a computer provided in a telephone switching system to perform the steps of; detecting whether a first terminal among terminals, which are connected to the telephone switching system through physical ports, is disconnected from a first physical port among the physical ports, and then a second terminal is connected to the first physical port; and storing connection information in connection information storing means so that desired connection information representing a connecting relation between the first physical port and the second terminal is stored for the first physical port to which the second terminal is connected.

BRIEF DESCRIPTION OF THE DRAWINGS

This above-mentioned and other objects, features and advantages of this invention will become more apparent by reference to the following detailed description of the invention taken in conjunction with the accompanying drawings, wherein.

DETAILED DESCRIPTION OF THE PREFERRED EMBODIMENT

Figure 1:
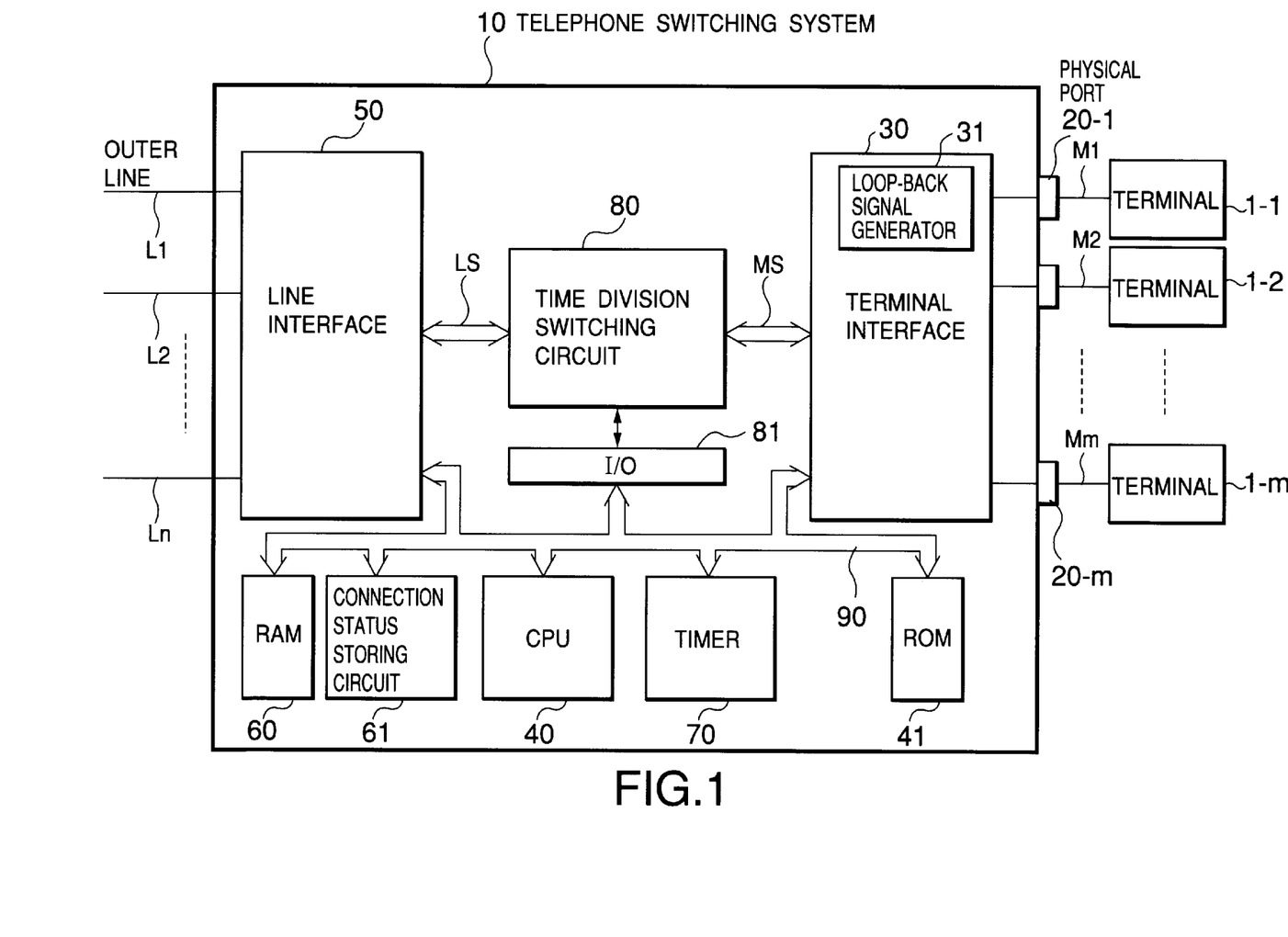
FIG. 1 is a block diagram of a telephone system according to an embodiment of the present invention.

FIG. 1 is a block diagram of a telephone switching system according to an embodiment of the present invention. In the figure, a telephone switching system 10 has a plurality of physical ports 20-1–20-m (m being an integer) consisting of connectors to which respective terminals 1-1–1-m are connected, a terminal interface 30 connecting to the physical ports 20-1–20-m, a central processing unit (CPU) 40, an line interface 50 connecting to outer lines L1–Ln (n being an integer) which are connected to a public exchange or a private branch exchange (PBX), and a time division switching circuit 80.

The terminals 1-1–1-m connect the physical ports 20-1–20-m consisting of connectors through connection cords M1–Mm. However, all the physical ports are not necessarily connected to terminals. In addition, although the terminal is a telephone set, different types of telephone sets, for example, telephone sets with different number of keys or with or without a display may be used.

The line interface 30 is connected between a voice bus MS of the terminal 1-1–1-m and the time division switching circuit 80 and an internal bus 90 of the CPU 40. Voice data is transmitted and received between each terminal and the time division switching circuit 80 through the terminal interface 30 and the voice bus MS. In addition, control data and connection information, described later, are transmitted and received between each terminal and the CPU 40 through the terminal interface 30 and the internal bus 90. Voice data and control data between each terminal and the telephone switching system 10 are time division data which the telephone switching system 10 and each terminal can process in a time-divisional manner.

The line interface 50 is connected between the outer lines L1–Ln and a voice bus LS of the time division switching circuit 80, and between the outer lines L1–Ln and the internal bus 90 of the CPU 40. The voice data is transmitted and received between each outer line and the time division switching circuit 80 through the line interface 50 and the voice bus LS. In addition, control data indicative of outer line conditions and for outer line connection is transmitted and received between the line interface 50 and the CPU 40 through the internal bus 90.

The time division switching circuit 80 time divisionally forms a channel between each terminal and the outer lines L1–Ln through the voice buses LS and MS. In addition, it also forms an extension channel between each terminal. Accordingly, it is possible to perform an extension call between each terminal and a line wire call between the terminal and the outer line. Formation of a channel is controlled by the CPU 40 through an input/output (I/O) interface 81.

The internal bus 90 of the CPU 40 is further connected to a RAM 60, which is a connection information storing means, a connection status storing circuit 61 for storing connection status with a physical port of each terminal, a ROM 41 which stores a program for executing control by the CPU 40, and a timer 70. The telephone switching system 10 is to determine the type of terminals 1-1–1-m, to perform normal telephone functions and to attain the object of the invention through modification of connection information as the terminal is moved, under control of the CPU 40.

On the other hand, each of the terminals 1-1–1-m comprises devices such as keys for call and a receiver which are seen on an ordinary telephone terminal, and a storing circuit holding information indicative of the type of terminal, and can deliver such type of terminal in response to a request from the CPU 40.

Figure 2:
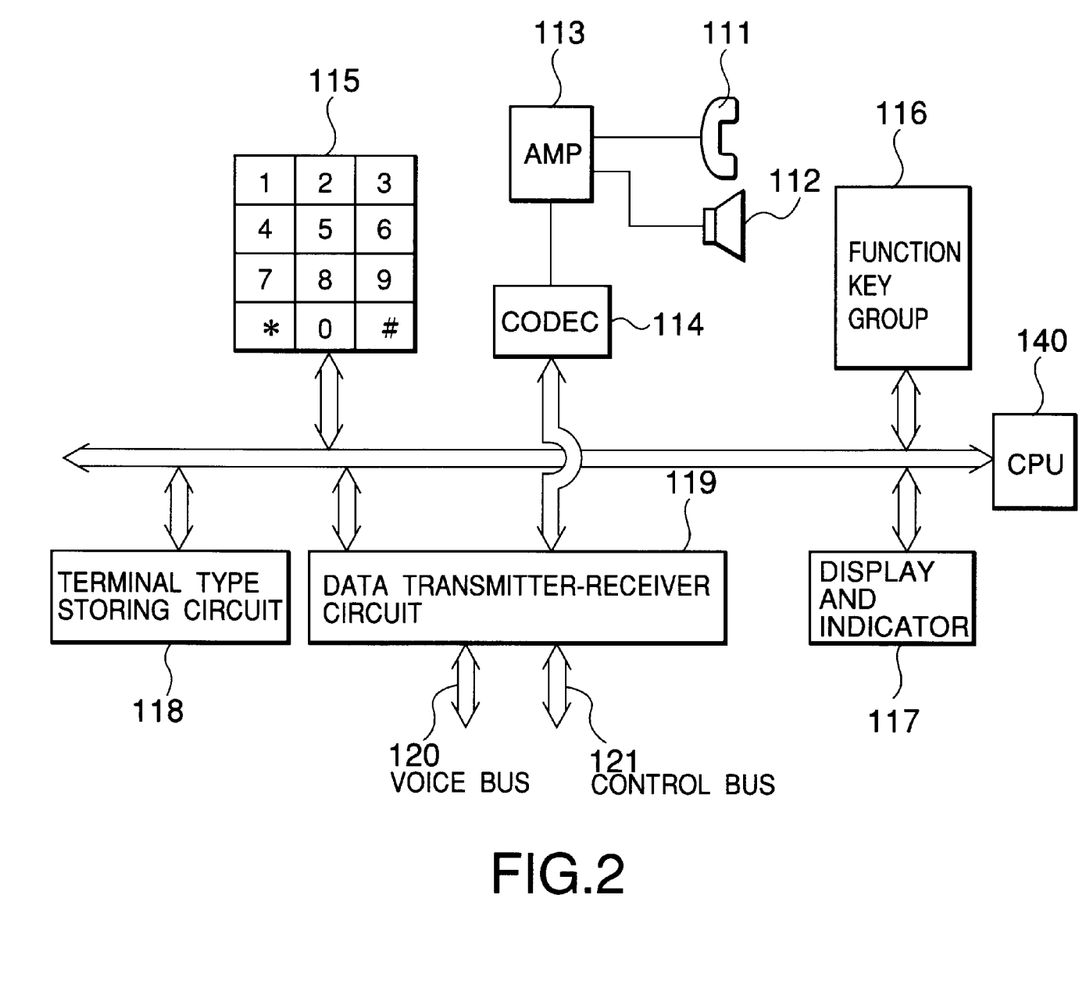
FIG. 2 is a detailed block diagram of a terminal in the telephone system of FIG. 1.

FIG. 2 is a detailed block diagram of the terminal 1-1. In the figure, a handset 111 and a speaker 112 are connected to an amplifier 113. The amplifier 113 is connected to a voice codec 114. The voice codec 114 converts a voice signal from the handset 111 into digital data, and outputs it to a data transmitter-receiver circuit 119; and converts voice data from the data transmitter-receiver circuit 119 into an analog voice signal, and outputs it to the amplifier 113.

Connected to a bus of a CPU 140 are a dialing operation section 115, a function key group 116, a terminal type storing circuit 118, a display and indicator circuit 117, and the data transmitter-receiver circuit 119.

The terminal type storing circuit 118 stores data indicative of the type of each terminal. The terminal type indicates difference of type of a telephone set such as functions of a terminal, number of function keys, and presence or absence of a display. The terminal type is previously stored when it is manufactured.

The data transmitter-receiver circuit 119 is connected to a voice bus 120 and a control bus 121 which connect to the terminal interface 30. The data transmitter-receiver circuit 119 transmits voice data from a voice codec 114 to the voice bus 120, and transmits key operation information from the terminal type, the dialing operation section 115 and the function key group 116 to the control bus 121 as control data. In addition, the data transmitter-receiver 119 transmits voice data from the voice bus 120 to the voice codec 114, and receives control data from the control bus 121 to control the display and indicator circuit 117 and other sections of the telephone set.

The voice bus 120 and the control bus 121 are connected to the voice bus MS and the internal bus 90 through the terminal interface 30 of the telephone switching system 10 of FIG. 1.

The terminals 1-2 to 1-m may be same as the terminal 1-1 of FIG. 2, or may be of a different terminal type (type or specifications as a telephone set).

Referring FIG. 1 again, the telephone switching system 10 allocates to each terminal an extension number for extension call as connection information. The extension number is stored in a correspondence table in the RAM 60 together with the number of physical port to which each terminal is connected (physical port number).

In originating an extension call, when, for example, the terminal 1-1 attempts to call another terminal 1-2, the extension number of the terminal 1-2 is entered through a predetermined key operation such as abbreviated dialing on the dialing operation section 115 or the function key group 116 of FIG. 2. The entered extension number is informed to the CPU 40 through the physical port 20-1, the terminal interface 30, and the internal bus 90, and the CPU 40 retrieves, based on the informed extension number, the physical port number of the physical port 20-2 corresponding to the extension number from the correspondence table in the RAM 60.

Then, when the CPU 40 invokes the terminal 1-2 connected to the physical port 20-2, and detects an response from that terminal, the CPU 40 controls the time division switching circuit 80 to establish a time divisional call path between the terminals 1-1 and 1-2. In such a way, the telephone switching system 10 identifies each terminal, and establishes a call and a call path based on the physical port number.

In a case of originating a line wire call from a terminal to an outer line, the CPU 40 does not reference the correspondence table in the RAM 60, but determines whether or not the outer line is in use by control data from the line interface 50 to connect a call path.

The RAM 60 storing connection information is address managed by a RAM management program in the ROM 41. More particularly, it stores connection information such as extension numbers in a form of a correspondence table as shown in FIG. 3 by using a memory pointer.

Figure 3:
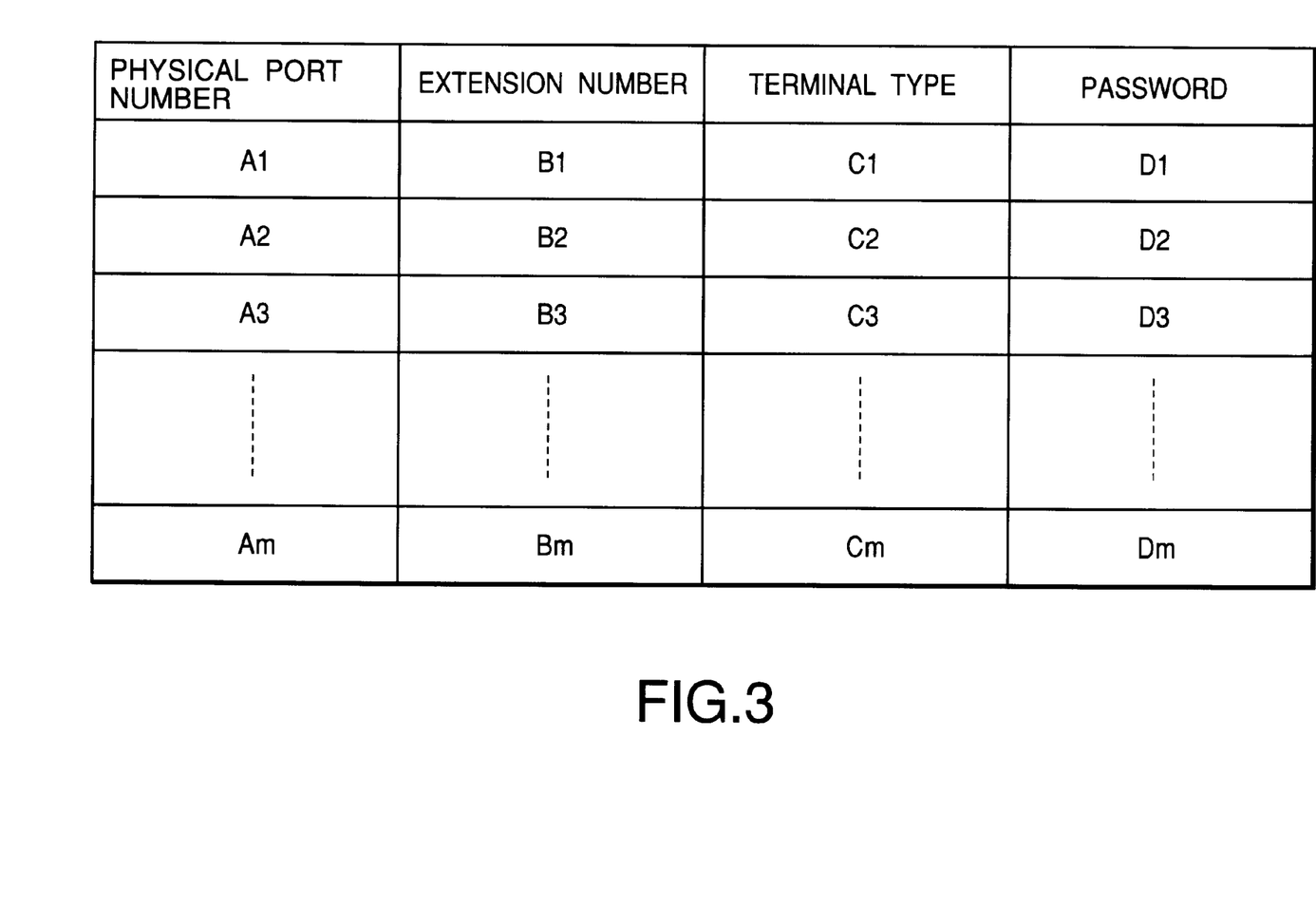
FIG. 3 is a correspondence table in a RAM storing connection information.

Referring to FIG. 3, the connection information is composed of physical port numbers, extension numbers, types of terminal, and passwords. Here, a password is information for uniquely identifying a user using each terminal. These connection information is arranged to be registered in the correspondence table in the RAM 60 when a terminal is initially connected.

More specifically, it may be arranged that an exclusive connection information input device (not shown) is connected to the internal bus 90 of the telephone switching system 10, and, when a new terminal is connected, an administrator inputs connection information through the connection information input device for storage in the correspondence table in the RAM 60. Alternatively, it may be arranged that, when a new terminal is connected, connection information is input from the terminal by using a computer program in the ROM 41 for storage in the correspondence table in the RAM 60. Arrangement is not limited to specific ones.

Although the embodiment is arranged to store connection information by using the RAM 60, various storage media such as a magnetic disk or optical disk may be applied as long as they can store at least such information. However, since such storage medium is subject to read/write processing, as described later, it is advantageous to use a storage medium of random access type.

As described above, the terminal interface 30 provides together with a physical port an interface function with each terminal. In addition, the terminal interface 30 has a loop-back signal generator 31, time divisionally delivers a loop-back signal to all physical ports 20-1–20-m under control of the CPU 40, and detects whether or not a terminal is connected to each physical port. That is, if a terminal is connected to a physical port, the terminal returns a loop-back signal, so that it is determined whether or not a connection is established. The result of detection for each physical port is input into the CPU 40 for storage in the connection status storing circuit 61. Therefore, connection status detector means is constituted by the loop-back signal generator 31, the CPU 40 and the connection status storing circuit 61.

The timer 70 is to determine the time when a terminal is disconnected from a physical port. The time affects the operation of the CPU 40, described later. In addition, the timer 70 is individually provided for each physical port.

The CPU 40 performs control of originating and terminating and connection information registration control under a telephone system control program stored in the ROM 41.

Figure 4A:
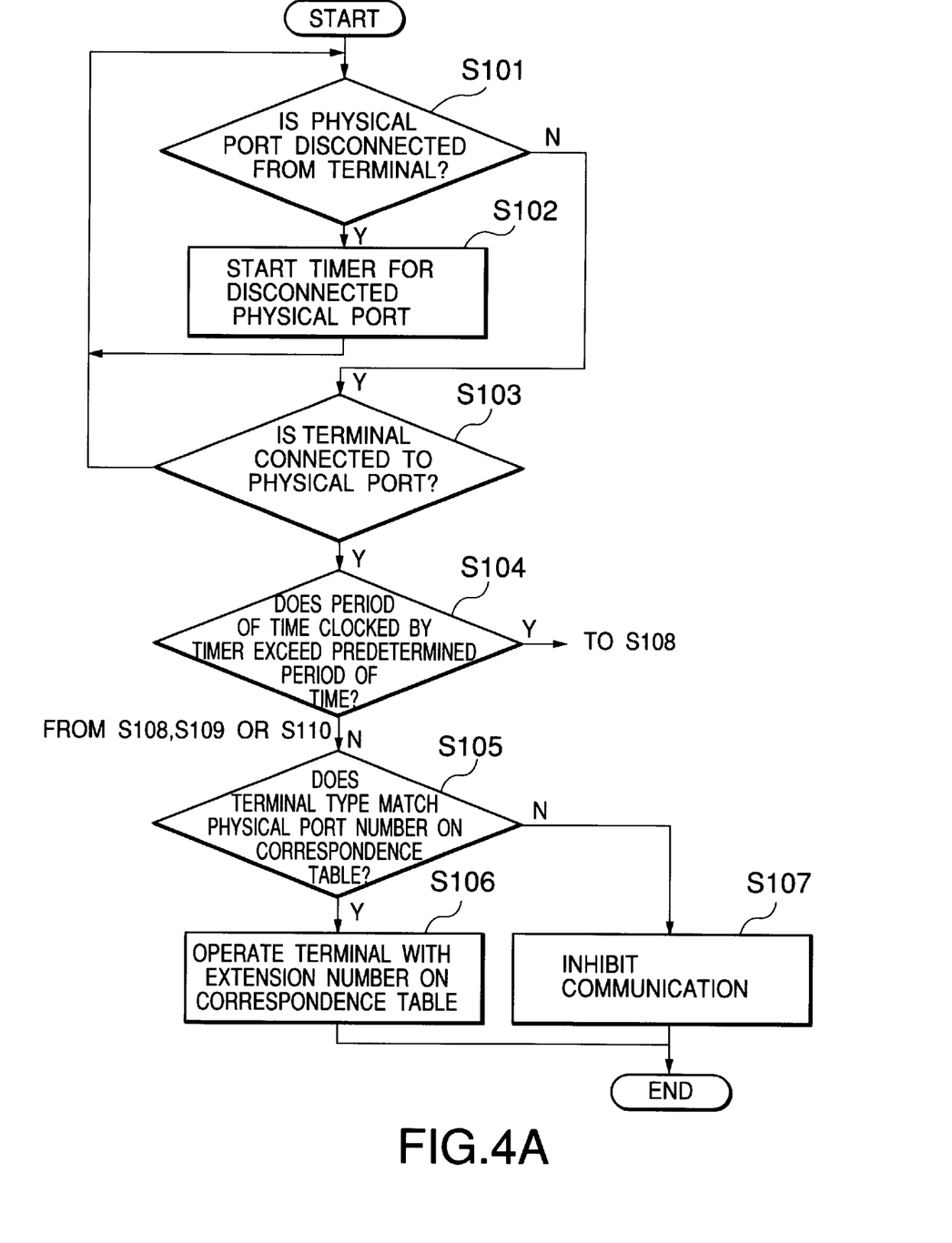
FIGS. 4A and 4B are flowchart for registration and control of connection information in the telephone system control program.
Figure 4B:
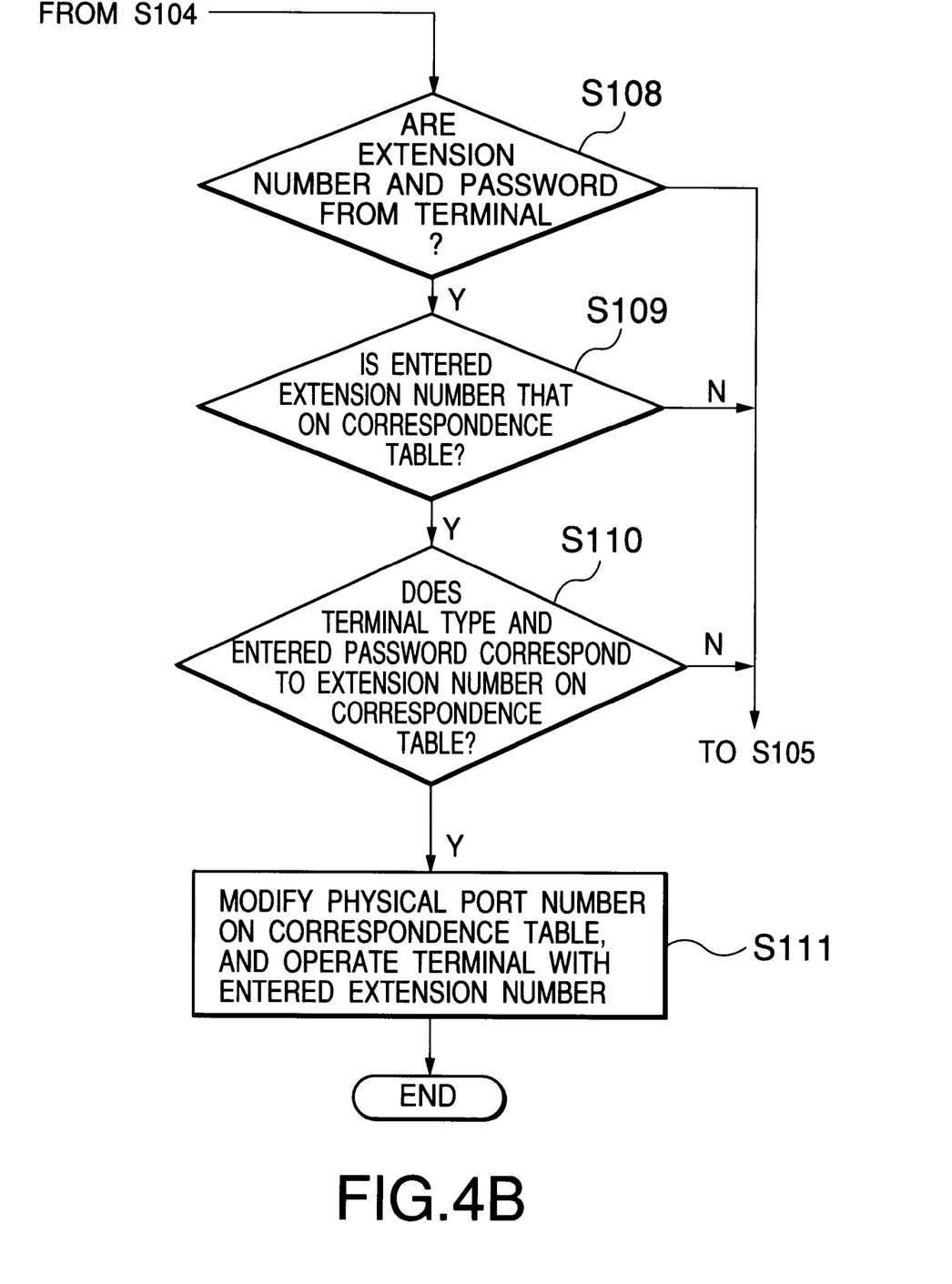

The CPU 40 executes a program which performs the connection information registration control based on the flowchart shown in FIGS. 4A and 4B. Therefore, the ROM 41 is written with a program executing the flowchart of FIGS. 4A and 4B.

Referring to FIG. 4A, initially in step S101, the CPU 40 prompts the loop-back signal generator 31 of the terminal interface 30 to deliver a loop-back signal, and determines whether or not each physical port is disconnected from the terminal. Here, if it cannot be detected that a terminal is disconnected from a physical port, the process jumps to step S103. Similarly, in step S103, it is determined whether a terminal is connected to the physical port 20 determined not to be connected with a terminal by the loop-back signal. If it cannot be detected that a terminal is connected, the process returns back to step S101.

In such a way, if there is no change in the connection status of terminal, the process loops between steps S101 and S103, and each physical port cyclically delivers a loop-back signal to a terminal. Then, the result of determination is stored for each physical port number in the connection status storing circuit 61.

Incidentally, disconnection of a terminal referred to in step S101 means a state where a terminal once connected is disconnected, and does not include a state where a terminal is not connected from the beginning. Similarly, the connection of a terminal referred to in step S103 means a state where a terminal is connected after it is once disconnected, and does not include a state where a terminal is connected from the beginning.

In these steps S101 and S103, the CPU 40 may compare the result of detection of the terminal stored in the connection status storing circuit 61 with the previous loop-back signal with the result of detection with the next loop-back signal to determine whether the terminal is connected or disconnected.

If a terminal is determined to be disconnected in step S101, the CPU 40 causes the timer 70 to start for the physical port (assuming 20-1) from which the terminal is disconnected in step S102. The timer 70 is to clock for a predetermined period of time, and various technologies can be applied. For example, it may be constructed to clock for a predetermined period of time, or to be freely varied for the clocking period of time by its user. The arrangement may be appropriately changed.

Then, if step S103 determines that after a terminal is once disconnected from the physical port 20-1, another terminal (may be same or different terminal) is connected to the physical port 20-1, step S104 determines whether or not the timer 70 clocks the predetermined period of time for the physical port 20-1. Here, the clocking time of the timer 70 assumes a case where a terminal is temporarily disconnected other than movement of the terminal user. Accordingly, the predetermined period of time of the timer 70 is set to about 30 minutes.

If the timer 70 does not clock the predetermined period of time, the process proceeds to step S105 where the CPU 40 acquires a terminal type from the terminal connected to the physical port 20-1. Thereafter, the CPU 40 determines whether or not the combination of the physical port number of the physical port 20-1 (here, it is assumed to be A1) and the acquired terminal type matches information stored in the correspondence table (FIG. 3) in the RAM 60.

Here, if they match (a case where the terminal type is B1), step S106 does not modify the data on the correspondence table, accepts the connection of the terminal as is, and operates the terminal with an applicable extension number.

On the other hand, if, in step S105, there is no matched entry (combination of the physical port number of the physical port 20-1 and the terminal type acquired from the terminal) in the correspondence table in the RAN 60, the step S107 stops or inhibits communication with the terminal connected to the physical port 20-1. That is, when a terminal is connected again, the CPU 40 determines identity of the terminal previously connected and the terminal after reconnection based on the information of the physical port number and the terminal type, and inhibits communication with the terminal reconnected to the physical port 20-1 if the identity cannot be confirmed.

Therefore, if the terminal type reconnected to the physical port is the same as that of the terminal before the reconnection during the clocking of the timer 70, communication can be performed as it is, and, if the terminal types differ each other, communication would not be performed. Thus, an advantage can be expected that, when a terminal is disconnected from a physical port within a short time, a terminal with mismatched type is prevented from being erroneously used for the physical port. In addition, since the user is not usually relocated within the setting time of the timer 70, the connection information would not be changed when the connection is temporarily disconnected.

In the embodiment, step S105 determines the consistency of previous terminal type for a terminal once disconnected from the physical port 20 and reconnected within the predetermined period of time set to the timer 70. It inhibits communication with the terminal if there is no consistency. However, such arrangement is not necessarily maintained. For example, when only terminals all the type of which are same are used, it may be possible to unconditionally reflect the previous connection information, or to suitably modify it when reconnection is made for a physical port 20-1 in a predetermined period of time.

On the other hand, if the timer 70 completes the clocking for the predetermined period of time for the physical port 20-1 in step S104, the process proceeds to step S108 of FIG. 4B. Here, the fact that the predetermined period of time is expired for the timer 70 means a case where the terminal is disconnected for an extended period of time due to relocation of the terminal or the like.

In step S108, the CPU 40 requests the connected terminal to enter an extension number and a password. This request is informed to a CPU 140 of the terminal (FIG. 2) through the terminal interface 30. Here, if no extension number nor password is entered from the dialing operation section 115 of FIG. 2, the process proceeds to step S105 to perform processing similar to the above.

On the other hand, if an extension number and a password are entered in step S108, the CPU 40 retrieves the RAM 60 in step S109 to determine whether the entered extension number exists on the correspondence table in the RAM 60. Then, if the extension number does exist, the terminal type is acquired from the terminal in step S110, and it is determined whether or not the acquired terminal type and the entered password correspond to the extension number stored in the correspondence table. For example, when it is assumed that the extension number entered in step S108 is B2, and the entered password is D2, it is confirmed in step S109 from the correspondence table of FIG. 3 that the extension number B2 exists. It is confirmed in step S110 that the acquired terminal type C2 and the entered password D2 correspond (relate) to the extension number B2 in the correspondence table.

When, in step S110, the entered password and the acquired terminal type correspond to the extension number on the correspondence table, step S111 determines whether there exists connection information at the physical port number A1 of the physical port 20-1 in the correspondence table.

Here, if the connection information exists, the CPU 40 erases or deletes only the physical port number A1 (which is stored with extension number B1, terminal type C1) and the physical port number A2 (which is stored with extension number B2, terminal type C2) is rewritten to the currently connected physical port number A1 for the entry on the correspondence table which has the password D2 entered from the terminal connected to the physical port 20-1 after clocking the timer time and the extension number B2.

This enables the terminal to properly operate by linking the connected terminal and the physical port number.

Furthermore, if it is determined in each of steps S108 through S110 that there is no consistency, the process proceeds to step S105 where processing similar to the above is performed. In this case, if a terminal of terminal type not previously stored in the RAM 60 is connected to physical port 20-1 in step S107 (FIG. 4A), communication is inhibited with the terminal, whereby erroneous operation can be prevented.

In the embodiment, it is arranged to determine whether or not, when a terminal is reconnected to a physical port 20-1 with a time interval exceeding a predetermined period of time, connection information is made valid based on an extension number and a password entered from the terminal, and a terminal type acquired from the terminal. Such arrangement is not necessarily maintained. Validity of connection information may be determined on the basis of only the extension number or only the password.

With only the extension number, the extension number is received from the terminal through the physical port under control of the CPU 40, and the received extension number is determined to be stored in the RAM 60 which stores connection information. If it is stored, modification is made for the RAM 60 from the previously stored connection information to desired connection information including an extension number in accordance with the physical port.

As described, in a telephone switching system 10 comprising a plurality of physical ports 20 for switching removable terminals based on predetermined connection information, it is made possible to store and rewrite such connection information in the RAM 60 by entering such information through the terminal, the CPU 40 rewrites the connection information stored in the RAM 60 so that, when a physical port connecting to a terminal interface 30 is reconnected from a first terminal to a second terminal, an extension number the user desires is stored for the physical port for which the terminal is reconnected. Thus, it is possible to provide a telephone system to which connection information set for another terminal is reflected as in the prior art, so that mismatch of connection information such as an extension number cannot be caused.

As described above, the present invention can provide a telephone switching system which prevents connection information for a different terminal being reflected, so that mismatch of connection information such as an extension number cannot be caused.

In addition, it is arranged that connection information is invalidated for a terminal disconnected for a time interval exceeding the predetermined period of time set to the timer 70, so that serviceability can be improved for maintenance operation such as exchanging of a cable.

Furthermore, since the telephone switching system can be controlled by using a computer program, not only equipment can be simplified, but also a different control system can be attained by exchanging a storage medium in which the computer program is stored, whereby expandability can be enhanced.

What is claimed is:

1. A telephone switching system connecting an outer line and a plurality of telephone terminals (hereinafter simply called the "terminal"), said exchange comprising:
    physical ports for individually connecting to said terminals;
    an exchange for switching between said terminals and said outer line through the physical ports and between said terminals through said physical ports based on predetermined connection information;
    a connection information storing device for storing individual connection information representing a connecting relation between each of said terminals and said physical port;
    detecting means for detecting whether a first terminal among said terminals is disconnected from a first physical port among said physical ports, and then a second terminal is connected to said first physical port;
    connection information modifying means for modifying the connection information stored in said connection information storing device so that desired connection information representing a connecting relation between said first physical port and said second terminal is stored for said first physical port to which said second terminal is connected; and
    said connection information modifying means comprises a timer device performing clocking for a predetermined period of time, when said detecting means detects disconnection of said first terminal, said timer device being caused to start clocking for the predetermined period of time, when connection of said second terminal is detected after completion of said clocking, connection information stored in the connection information storing device being modified so that desired connection information is stored for a physical port to which said second terminal is connected.

2. The telephone switching system as set forth in claim 1, wherein
    said connection information modifying means receives said desired connection information from said terminal through said physical port.

3. The telephone switching system as set forth in claim 2, wherein
    said desired connection information contains an extension number of a terminal to be connected to said physical port.

4. The telephone switching system as set forth in claim 3, wherein
    said desired connection information includes an extension number of a terminal to be connected to said physical port, information by the type of said terminal, and a password.

5. The telephone switching system as set forth in claim 3, wherein
    said connection information modifying circuit receives said extension number from said terminal through said physical port, determines whether the received extension number is stored in said connection information storing means, and, if so, modifies previously stored connection information in accordance with said physical port to said desired connection information.

6. The telephone switching system as set forth in claim 4, wherein
    said connection information modifying means receives said extension number and said password from said terminal through said physical port, determines whether the received extension number is stored in said connection information storing device, if so, determines whether the password and the terminal type information are stored in the connection information storing means, and, if so, modifies previously stored connection information in accordance with said physical port to said desired connection information.

7. The telephone switching system as set forth in claim 1, wherein
    when said timer device is caused to start clocking, and said second terminal is connected before completion of the clocking, said connection information modifying means receives the terminal type from the second terminal through a physical port to which said second terminal is connected, and inhibits communication with said second terminal when said terminal type for said physical port is not stored in said connection information storing device.

8. The telephone switching system as set forth in claim 7, wherein
    when said timer device is caused to start clocking, and said second terminal is connected before completion of the clocking, said connection information modifying means receives the terminal type from the second terminal through a physical port to which said second terminal is connected, and maintains contents of said connection information storing device when said terminal type for said physical port is stored in said connection information storing means.

* * * * *